United States Patent
Pradhan et al.

(10) Patent No.: US 12,096,286 B2
(45) Date of Patent: Sep. 17, 2024

(54) ENDC HANDOVER MOBILITY SYSTEM

(71) Applicant: Rakuten Mobile, Inc., Tokyo (JP)

(72) Inventors: Vaibhav Pradhan, Tokyo (JP);
Sandeep Mani Tripathi, Tokyo (JP);
Krishnan Venkataraghavan, Tokyo (JP)

(73) Assignee: Rakuten Mobile, Inc., Tokyo (JP)

( * ) Notice: Subject to any disclaimer, the term of this patent is extended or adjusted under 35 U.S.C. 154(b) by 539 days.

(21) Appl. No.: 17/491,461

(22) Filed: Sep. 30, 2021

(65) Prior Publication Data

US 2023/0097617 A1 Mar. 30, 2023

(51) Int. Cl.
*H04W 36/00* (2009.01)
*H04W 36/08* (2009.01)

(52) U.S. Cl.
CPC . *H04W 36/0069* (2018.08); *H04W 36/00837* (2018.08); *H04W 36/08* (2013.01)

(58) Field of Classification Search
CPC ... H04W 36/008355; H04W 36/00837; H04W 36/08; H04W 36/0069; H04W 36/008357
See application file for complete search history.

(56) References Cited

U.S. PATENT DOCUMENTS

2021/0044993 A1* 2/2021 Jha ................... H04W 36/30

FOREIGN PATENT DOCUMENTS

| CN | 111741496 A | * | 10/2020 | |
|---|---|---|---|---|
| CN | 111741496 A1 | | 10/2020 | |
| WO | WO-2020256443 A1 | * | 12/2020 | ........ H04W 36/0058 |

* cited by examiner

Primary Examiner — Chi H Pham
Assistant Examiner — Ji-Hae Yea
(74) *Attorney, Agent, or Firm* — HAUPTMAN HAM, LLP

(57) ABSTRACT

A method includes determining whether user equipment (UE) in a telecommunication network is configured to support evolved universal terrestrial radio access network dual connectivity (ENDC). Responsive to the UE being determined as configured to support the ENDC determining whether a source cell and a target cell are configured to support the ENDC. Performing on processing circuitry a first mobility modification in response to determining the source cell is an ENDC source cell and the target cell is a non-ENDC target cell. Performing on the processing circuitry a second mobility modification in response to determining the target cell is an ENDC target cell and the source cell is a non-ENDC source cell. The second mobility modification is different from the first mobility modification. Performing a handover from the source cell to the target cell in response to both the source cell and the target cell being configured for ENDC or non-ENDC.

20 Claims, 10 Drawing Sheets

ENDC HANDOVER MOBILITY SYSTEM

BACKGROUND

Telecommunication is the transmission of information by various types of technologies, such as wire, radio, optical, or electromagnetic systems. Telecommunication allows for communication, almost instantaneously, over small and large distances. The transmission media for telecommunications has evolved through numerous stages of technology, from beacons and other visual signals to electrical cable and electromagnetic radiation (e.g., radio, microwave transmission, optical fiber, and communications satellites).

In telecommunications, handover, or handoff, is the process of transferring an ongoing call or data session from one channel connected to a core network to another channel. There are many different reasons why a handover might be conducted. For example, a handover occurs when a mobile computing device is moving away from a first area covered by a first telecommunications cell (e.g., a first antenna coverage area) and enters a second area covered by a second telecommunications cell (e.g., a second antenna coverage area). The call or data connection is transferred from the first telecommunications cell to the second telecommunications cell in order to avoid call or data connection termination when the mobile computing device goes outside the range of the first telecommunications cell.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features are arbitrarily increased or reduced for clarity of discussion.

DETAILED DESCRIPTION

Figure 1:
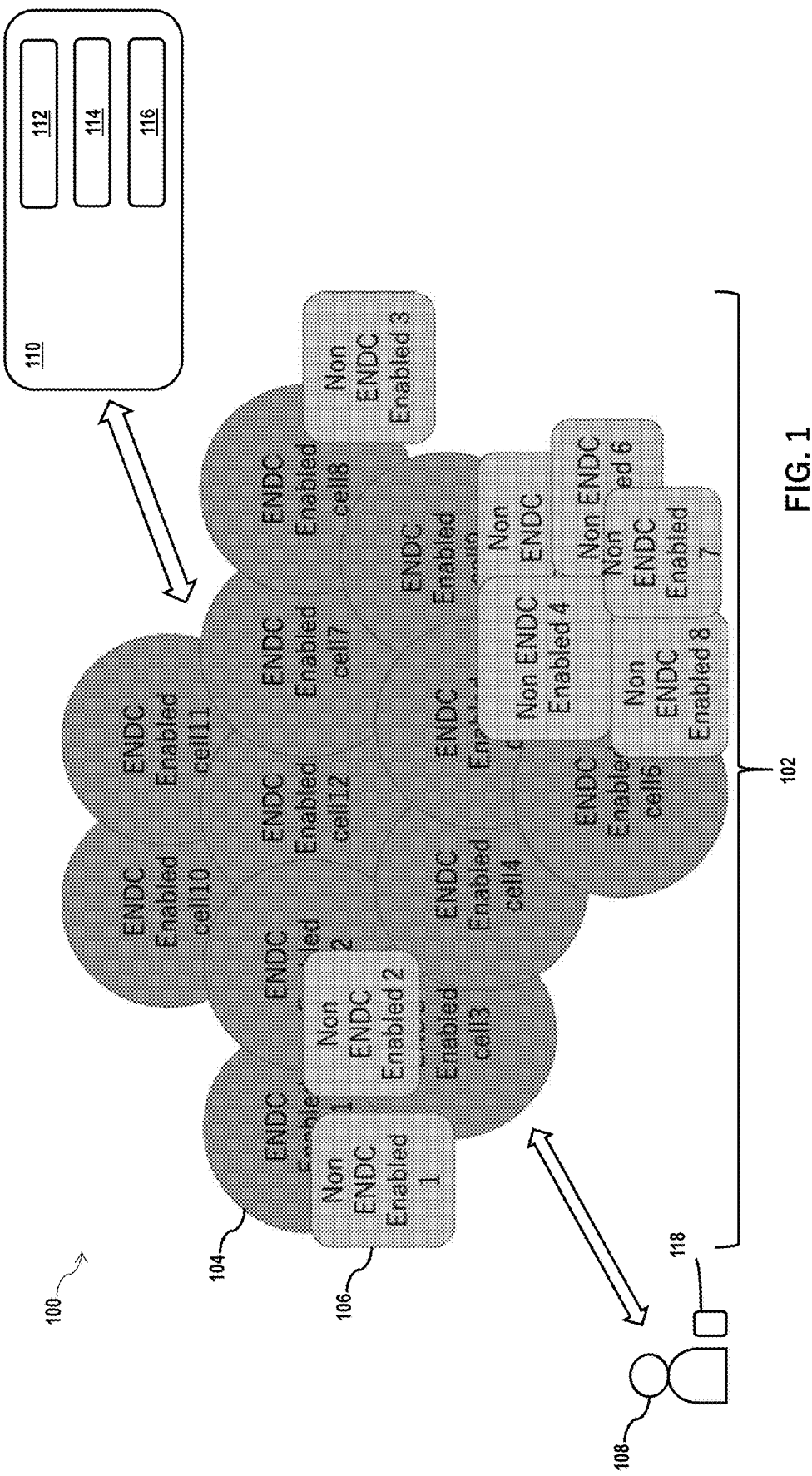
FIG. 1 is a diagrammatic representation of a telecommunications network (TN), in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, be used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors used herein likewise be interpreted accordingly.

In some embodiments, long-term evolution (LTE) evolved universal terrestrial radio access network dual connectivity (ENDC) coverage is improved over other approaches. In some embodiments, a method for enhanced ENDC is performed through a system configured to control user mobility (e.g., user equipment handovers) between ENDC and non-ENDC cells. In some embodiments, this method is performed using a machine learning (ML) algorithm operating on ENDC processing circuitry.

FIG. 1 is a diagrammatic representation of a telecommunications network (TN) 100, in accordance with some embodiments.

TN 100 is configured with one or more cells 102. Cells 102 include one or more various types of cells, such as ENDC cells 104 and non-ENDC cells 106. TN 100 is in wireless communication with user equipment (UE) 118 which is commonly with user 108 (e.g., handheld or carried). Further, TN 100 is in communication with a central server 110 housing databases 112, 114, and 116. In TN 100 of FIG. 1, there are eight non-ENDC cells 104 and twelve ENDC cells 106. In some embodiments, there are more non-ENDC cells 104 and less ENDC cells 106. In some embodiments, there are more ENDC cells 106 and less non-ENDC cells 104. In some embodiments, there is more of both ENDC cells 106 and non-ENDC cells 104, or less of both ENDC cells 106 and non-ENDC cells 104, or other suitable combinations are within the contemplated scope of the disclosure.

In some embodiments, TN 100 includes a group of nodes (e.g., cells 102, UE 118, and central server 110) interconnected by telecommunications links configured to be used to exchange messages between the nodes. The links are configured to use a variety of technologies based on the methodologies of circuit switching, message switching, or packet switching, to pass messages and signals. Multiple nodes (e.g., cells 102) are configured to cooperate to pass the messages from an originating node (central server 110 or UE 118) to the destination node (e.g., UE 118 or central server 110) via multiple network hops. For this routing function, each node in the network is assigned a network address for identification and a location on the network. The collection of addresses in the network is called the address space of the network. Non-limiting examples of telecommunications networks include computer networks, the Internet, the public switched telephone network (PSTN), the global Telex network, the aeronautical ACARS network, the wireless radio networks of cell phone telecommunication providers, and other suitable networks are within the contemplated scope of the disclosure.

In some embodiments, a TN 100 includes a communication network where the link to and from end nodes is wireless. The TN 100 is distributed over land areas called cells, such as cells 102, each served by at least one fixed-location transceiver (e.g., typically three cell sites or base transceiver stations). These base stations provide the cell with the network coverage which is configured to be used for transmission of voice, data, and other types of content. When joined together, these cells provide radio coverage over a wide geographic area. This enables numerous portable transceivers, such as UE 118 (e.g., mobile phones, tablets and laptops equipped with mobile broadband modems, pagers, and other suitable devices are within the contemplated scope of the disclosure) to communicate with each other and with fixed transceivers and telephones anywhere in the TN 100, via base stations, even when some of the transceivers are moving through more than one cell during transmission.

In some embodiments, in a heterogeneous TN, such as TN 100, cells, such as cells 102, belong to different vendors, are of different makes and models, and are operated by different vendors. Further, each of cells 102 possibly has different original equipment manufacturers (OEMs). The cell types include macrocells, a distributed antenna system (DAS), and small cells.

A macrocell or macrosite is a cell in a TN 100 that supports radio coverage served by a high power cell site (e.g., tower, antenna, or mast). Generally, macrocells provide coverage larger than a small cell. The antennas for macrocells are mounted on ground-based masts, rooftops and other existing structures, at a height that provides a clear view over the surrounding buildings and terrain. Macrocell base stations have power outputs of typically tens of watts.

A DAS is a TN 100 of spatially separated antenna nodes connected to a common source via a transport medium that supplies wireless service within a geographic area or even inside a structure. DAS antenna elevations are generally at or below a clutter level (e.g., at or below rooftops and other existing structures) and node installations are compact. A distributed antenna system is deployed indoors (an iDAS) or outdoors (an oDAS).

Small cells (including microcells, picocells, and femtocells) are low-powered cellular radio access nodes that operate in a licensed and unlicensed spectrum and have a range of 10 meters to a few kilometers. Small cells, compared to the macrocell, have a shorter range and handle fewer concurrent calls or sessions. Existing wireless networks are configured to use small cells for the data capacity demands of "5G". Small cells allow the re-using of the same frequencies and large cellular network capacity, quality and resilience. A small cell antenna system is deployed indoors or outdoors.

Cells (e.g., macro/DAS/small cell) are spread across a TN, such as TN 100, and either support ENDC or will support ENDC in the future. Fifth generation (5G) new radio (NR) cells are currently deployed. However, when the cells don't support ENDC UE user 108 will remain on fourth generation (4G) technology.

In non-standalone (NSA) 5G, UEs are still connected to 4G LTE even in areas with 5G coverage. With a few exceptions, most 5G deployments utilize NSA architecture. One such exception is standalone (SA) 5G. NSA will likely remain in place for the next several years thus keeping 4G LTE as a piece and as part of NSA 5G. Most operators use ENDC to optimize both 5G and 4G LTE service. ENDC is an NSA 5G architecture that allows smartphones to access both 5G and 4G LTE networks at the same time. ENDC combines the bandwidth of 5G and 4G LTE effectively allowing network operators to take advantage of the benefits of both network technologies simultaneously. ENDC allows 4G LTE and 5G bandwidth to be used at the same time. When users attempt to download content, such as a video, the speed at which that video transfers comes from both 4G LTE and 5G downloading simultaneously.

In some embodiments, UE 118 is a computer or computing system. Additionally or alternatively, UE 118 has a liquid crystal display (LCD), light-emitting diode (LED) or organic light-emitting diode (OLED) screen interface, such as a user interface, providing a touchscreen interface with digital buttons and keyboard or physical buttons along with a physical keyboard. In some embodiments, UEs connect to the Internet and interconnect with other devices. Additionally or alternatively, UE 118 incorporates integrated cameras, the ability to place and receive voice and video telephone calls, video games, and global positioning system (GPS) capabilities. Additionally or alternatively, UEs run operating systems (OS) that allow third-party apps specialized for capabilities to be installed and run. In some embodiments, UE 118 is a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), a smart card, or other suitable devices are within the contemplated scope of the disclosure.

NSA mode of 5G new radio (NR) is an option of 5G NR deployment that is based on the control plane of a 4G LTE network for control functions. 5G NR is focused on a user plane. NSA is configured to speed up 5G adoption. In some embodiments, NSA mode is enhanced by a smart setting. In some embodiments, the smart setting is implemented through a ML algorithm. In some embodiments, the smart setting allows a user, currently connected to a source ENDC cell, to remain connected to the source ENDC cell longer before a handover to a non-ENDC cell. In some embodiments, the smart setting allows a user, currently connected to a source non-ENDC cell, to handover to a target ENDC cell before a standard handover to provide the user with ENDC service quicker and increase customer satisfaction.

Figure 9:
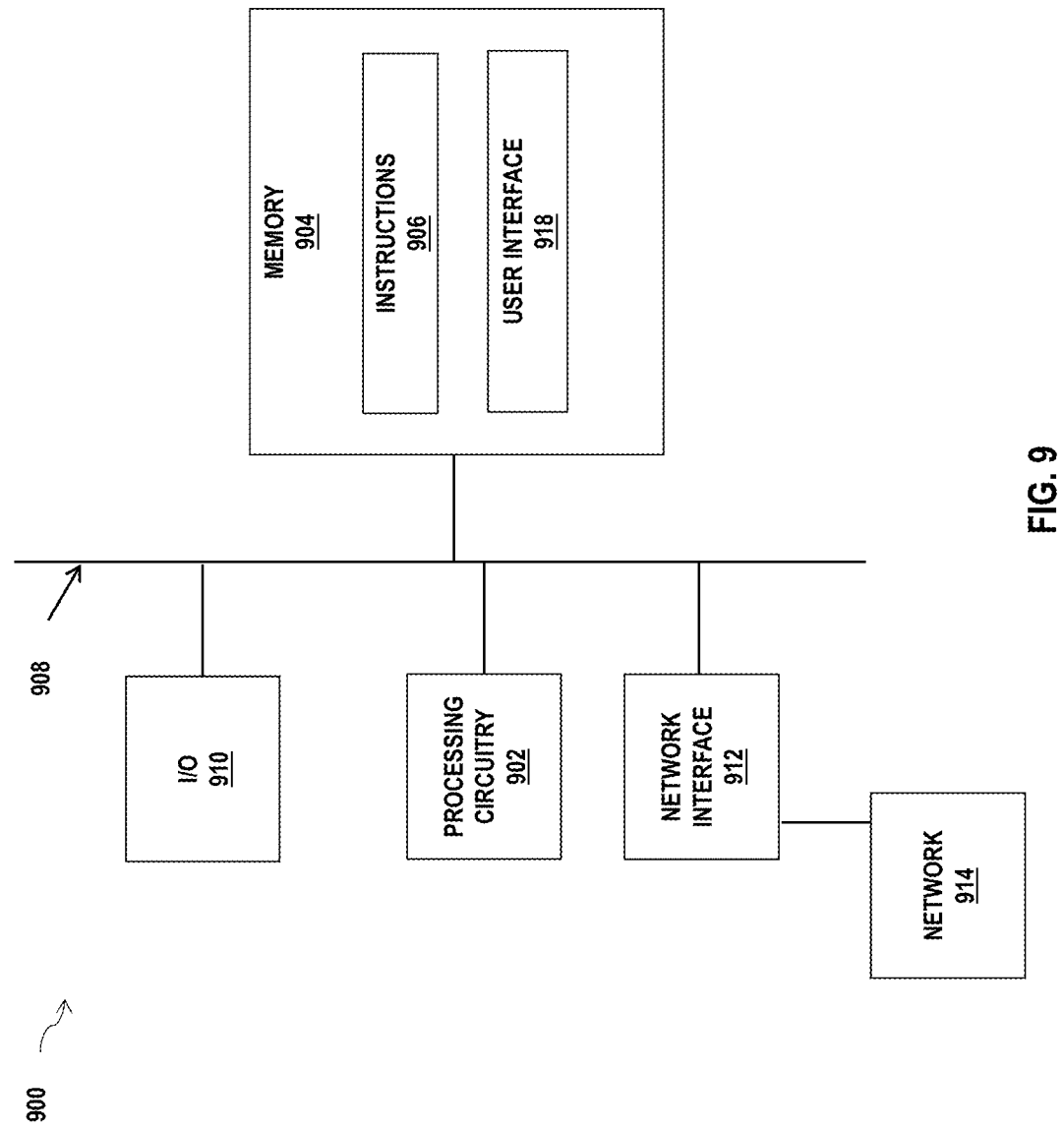
FIG. 9 is a high-level functional block diagram of a processor-based system, in accordance with some embodiments.

In some embodiments, the ML algorithm is stored on memory, such as memory 904, as instructions, such as instructions 906 (FIG. 9). In some embodiments, the ML algorithm is a computer algorithm that is configured to use experience and data to automatically improve. In some embodiments, artificial intelligence (AI) is configured to perform the function of the ML algorithm. In some embodiments, the ML algorithm builds models based on sample data, or training data, to make predictions or decisions without being explicitly programmed. In some embodiments, the ML algorithm uses computational statistics to make predictions based on statistical learning. In some embodiments, the ML algorithm is configured to use data mining focused on exploratory data analysis through unsupervised learning. In some embodiments, the ML algorithm is configured to use predictive analytics.

In some embodiments, handovers in a heterogeneous network, such as TN 100, are configured with a smart setting to proactively discover and provide 5G service to a user 108. In some embodiments, a handover success rate of the system is maintained at a high value. In some embodiments, packet loss (that occurs when one or more packets of data travelling across a network fail to reach their destination) caused by a handover is avoided leading to better throughputs.

In some embodiments, central server 110 detects, sets, and enhances ENDC coverage. In some embodiments, central server 110 is configured to execute the ML algorithm to detect, set and enhance ENDC coverage. In some embodiments, users, such as user 108, are allotted longer connectivity to an ENDC cell thus using the NR at better quality levels. In some embodiments, the ML algorithm collects and stores eNodeB (eNB) and ENDC data corresponding to each cell in the TN on one or more databases (DB) based on the TN, such as TN 100. In some embodiments, DB 112 is a database of enhanced Node B (eNB)/cells in TN 100. In some embodiments, DB 112 is a database of 4G LTE cells in TN 100.

The base stations in 4G LTE networks are called evolved Node B or eNodeB. In network architecture diagrams, eNodeB is often abbreviated as eNB. eNB is a part of the 4G LTE radio network and is capable of performing network control functions in addition to creating mobile network coverage. The 4G radio network does not have a separate network controller entity. This is different from the global system for mobile communications (GSM) and the universal mobile telecommunications system (UMTS) networks that have base station controllers (BSC) and radio network controllers (RNC) respectively for network control tasks. For LTE, eNB is able to perform the radio access functions that are equivalent to the combined work that Node B and RNCs do in 3G UMTNs. eNB represents the 4G LTE radio access network evolved UMTS terrestrial radio access network (E-UTRAN). eNB connects to the 4G LTE core network which is the evolved packet core (EPC).

In some embodiments, DB 114 is a database of the ENDC enabled eNB/cells in TN 100. In some embodiments, DB 114 is a database of cells configured with ENDC 5G NR and 4G LTE capabilities. In some embodiments, DB 116 is a database of the non-ENDC enabled eNB/cells in TN 100. In some embodiments, DB 116 is a database of cells configured with 5G, but not 5G ENDC NR, and 4G LTE capabilities.

In some embodiments, central server 110 detects whether the UE 118 is ENDC supporting or not. In some embodiments, central server 110 checks the UE ENDC capability that is reported by the UE through the cells and whether the UE supports the frequency bands currently supported in TN 100 by a host operator. In some embodiments, UEs that support ENDC and support at least one ENDC frequency band supported by the TN are considered ENDC supported UEs. In some embodiments, UEs that do not support ENDC or do not support at least one ENDC frequency band are considered non-ENDC UEs.

In some embodiments, central server 110 is a piece of computer hardware or software (e.g., a computer program) that provides functionality for other programs or devices, called clients, such as UE 118 and cells 102. The server offers various functionalities, often called services, such as sharing data or resources among multiple clients, or performing computation for a client. In some embodiments, the central server serves multiple clients and a single client can use multiple servers. In some embodiments, central server is a database server, a file server, a mail server, a print server, a web server, a game server, an application server, or other suitable servers and server combinations are within the contemplated scope of the disclosure.

In some embodiments, the ML algorithm is executed by central server 110. In some embodiments, central server 110 contains enhanced ENDC processing circuitry 900 (FIG. 9) that executes the ML algorithm. In some embodiments, the ML algorithm determines whether there are potential non-ENDC to ENDC handovers in TN 100. In some embodiments, when at least one pair or multiple pairs of ENDC cells are detected, ML algorithm enhances the ENDC coverage for the UE by retaining the UE on an ENDC supported cell for as long as possible. In some embodiments, a neural network is configured to be used with or in place of the ML algorithm.

In some embodiments, the ML algorithm is configured to determine whether a cell or UE supports ENDC. In some embodiments, the ML algorithm determines whether the cell and/or UE support eNB. In some embodiments, the ML algorithm is configured to determine if there is an upper layer indicator and the upper layer indicator indicates the cell and/or UE supports ENDC. In some embodiments, the ML algorithm determines whether an NR absolute radio-frequency channel number (ARFCN) definition is missing. The ARFCN is a code that specifies a pair of reference frequencies used for transmission and reception in a radio system. In some embodiments, the ML algorithm is configured to determine whether a secondary next generation NodeB (SgNB) node exists (e.g., the SgNB is configured to be used along with an eNB to communication in both 4G and 5G; ENDC).

If the cell eNB, there is an upper layer indicator (and it is set to true; indicating ENDC support) detected, there is NR ARFCN (e.g., frequencies supporting ENDC) and at least one SgNB exists, then the equipment supports ENDC. If the cell does not support eNB, there is no upper layer indicator detected, there is no NR ARFCN (e.g., no frequencies supporting ENDC) and no SgNB, then the equipment does not support ENDC.

Figure 2:
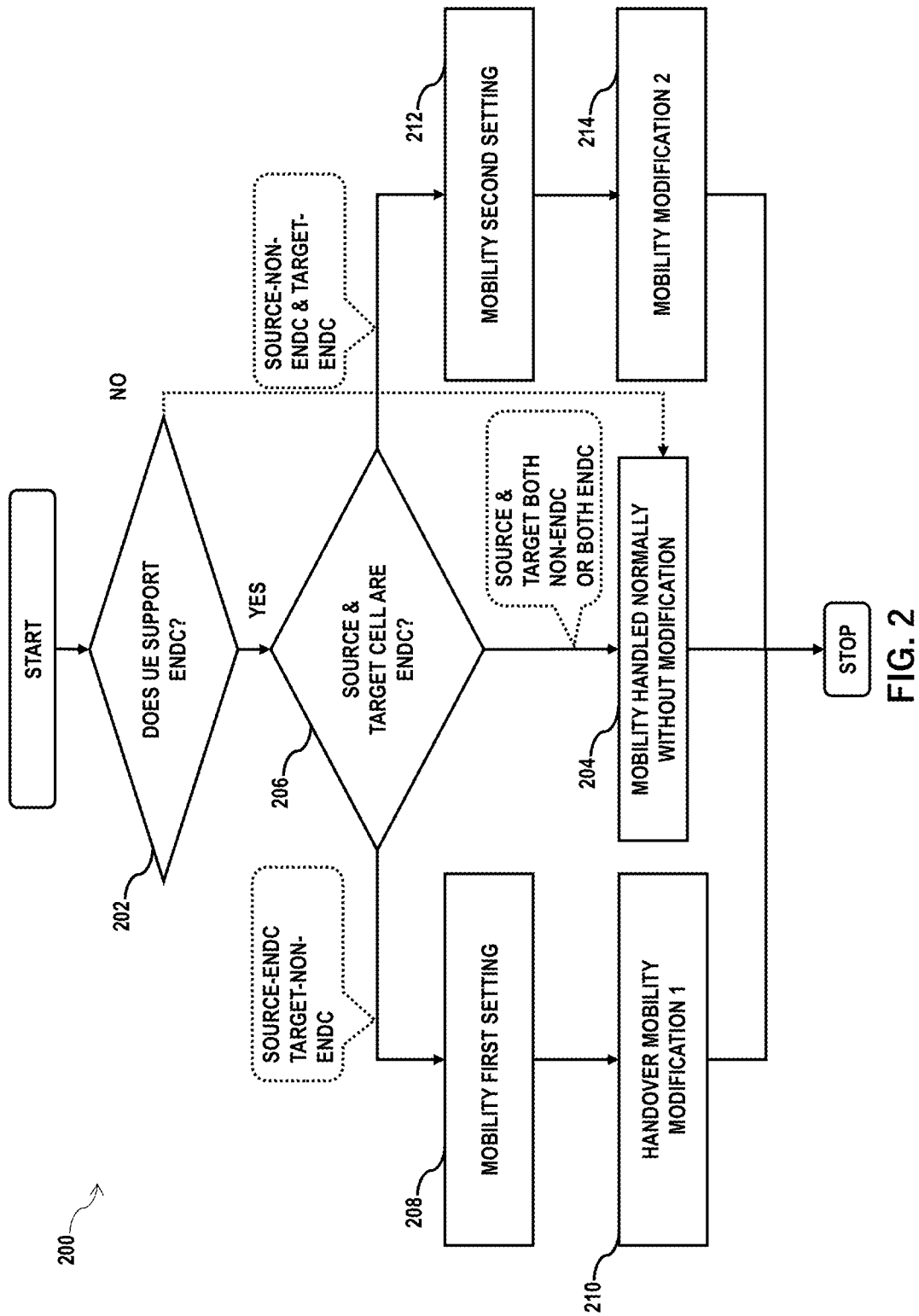
FIG. 2 is a flow diagram representation of a method for enhanced evolved universal terrestrial radio access network dual connectivity (ENDC), in accordance with some embodiments.

FIG. 2 is a flow diagram representation of a method for enhanced evolved universal terrestrial radio access network dual connectivity (ENDC) 200, in accordance with some embodiments.

Method 200 is configured to be used to enhance ENDC mode for a user, such as user 108. Method 200 is configured to be used in a heterogeneous network, such as TN 100, to increase the time a user spends on an ENDC supported source cell. The sequence in which the operations of method 200 are depicted in FIG. 2 is for illustration only; the operations of method 200 are capable of being executed in sequences that differ from that depicted in FIG. 2. In some embodiments, operations in addition to those depicted in FIG. 2 are performed before, between, during, and/or after the operations depicted in FIG. 2.

In some embodiments, one or more of the operations of method 200 are a subset of operations of a method of enhancing ENDC. In various embodiments, one or more of the operations of method 200 are performed by using one or more processors, e.g., a processor 902 discussed below with respect to enhanced ENDC processing circuitry 900 and FIG. 9.

At operation 202 of method 200, the central server determines whether the UE, such as UE 118, supports ENDC and whether the UE supports at least one ENDC frequency band. When the UE does not support ENDC or at least one ENDC frequency band ("NO" branch of operation 202) operation flows to operation 204 where the UE mobility (e.g., handover operation) is handled normally without handover modification. In some embodiments, if the UE does not support ENDC or at least one ENDC frequency, then the UE performs a handover operation between cells in a non-enhanced fashion.

When the UE does support ENDC and the UE supports at least one ENDC frequency band ("YES" branch of operation 202) operation flows to operation 206 where the central server determines whether the source cell (e.g., a primary cell the UE is configured to use for communications) and the target cell (e.g., a secondary cell the UE will potentially use when the user leaves a coverage area of the primary cell) support ENDC.

At operation 206 of method 200, the central server determines whether the source cell and the target cell support ENDC. When the source cell and the target cell are both non-ENDC or both support ENDC ("source & target both non-ENDC or both ENDC" branch of block 206) operation flows to operation 204 where mobility is handled normally without handover modification. Enhanced ENDC is performed on heterogeneous (ENDC and non-ENDC cells) cell types.

When the source cell supports ENDC and the target cell does not support ENDC ("source-ENDC target-non-ENDC" branch of block 206) operation flows to operation 208 where a mobility first setting is determined. Operation then flows to operation 210 where the mobility first setting is applied to a handover mobility modification 1. In some embodiments, handover mobility modification 1 applies the first setting to a handover algorithm to retain the UE on the source cell until a first predetermined threshold. In some embodiments, the first predetermined threshold is determined by the ML algorithm. In some embodiments, the first predetermined threshold is initially set by an OEM or the user.

When the source cell does not support ENDC and the target cell does support ENDC ("source-non-ENDC target-ENDC" branch of block 206) operation flows to operation 212 where a mobility second setting is determined. Operation then flows to operation 214 where the mobility second setting is applied to a handover mobility modification 2. In some embodiments, handover mobility modification 2 applies the mobility second setting to the handover algorithm to handover the UE from the source cell to the target cell once a predetermined threshold is met. In some embodiments, the mobility second setting initiates a handover from the source cell to the target cell earlier or before a non-modified handover operation between source and target cells. In some embodiments, handover mobility modification 2 applies the second setting to a handover algorithm to handover the UE on the source cell to the target cell when a second predetermined threshold is met. In some embodiments, the second predetermined threshold is determined by the ML algorithm. In some embodiments, the second predetermined threshold is initially set by an OEM or the user.

Figure 3:
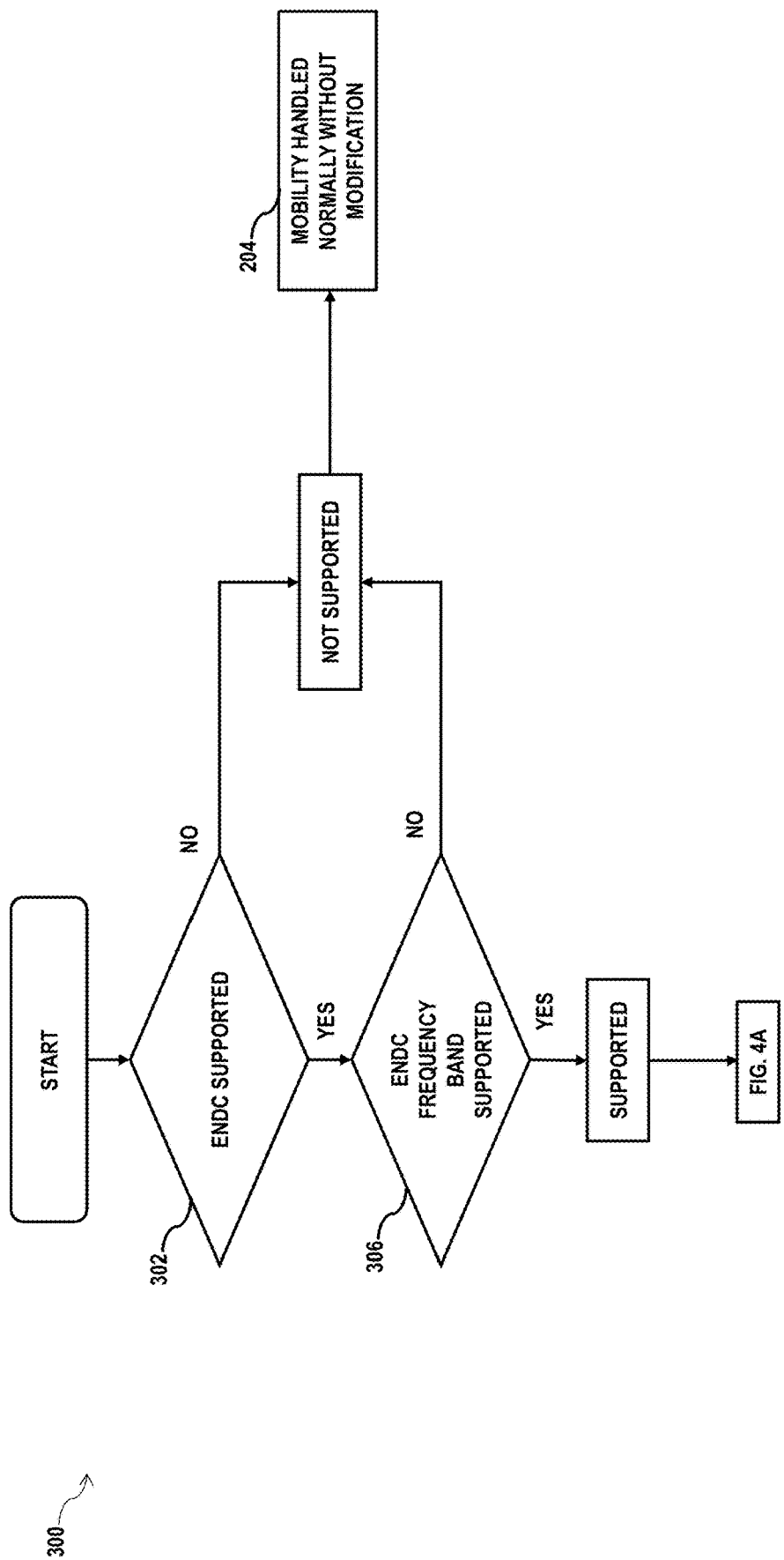
FIG. 3 is a flow diagram representation of a method of determining ENDC user equipment (UE), in accordance with some embodiments.

FIG. 3 is a flow diagram representation of a method of determining ENDC user equipment (UE) 300, in accordance with some embodiments.

Method 300 is configured to be used to determine whether the UE, such as UE 118, supports ENDC. Method 300 is configured to be used in a heterogeneous network, such as TN 100, to determine whether the UE supports ENDC. The sequence in which the operations of method 300 are depicted in FIG. 3 is for illustration only; the operations of method 300 are capable of being executed in sequences that differ from that depicted in FIG. 3. In some embodiments, operations in addition to those depicted in FIG. 3 are performed before, between, during, and/or after the operations depicted in FIG. 3.

In some embodiments, one or more of the operations of method 300 are a subset of operations of a method of enhancing ENDC 200. In some embodiments, method 300 is a subset of operation 202 of method 200. In various embodiments, one or more of the operations of method 300 are performed by using one or more processors, e.g., a processor 902 discussed below with respect to enhanced ENDC processing circuitry 900 and FIG. 9.

At operation 302 of method 300, the central server determines whether the UE, such as UE 118, supports ENDC. In some embodiments, the central server determines the UE capability via various radio resource control (RRC) or non-access stratum (NAS) messages. The central server determines UE capability that is reported by the UE, for example to central server 110, by UE 118. When the UE does not support ENDC ("NO" branch of operation 302) operation flows to operation 204 where the UE mobility is handled normally without handover modification. In some embodiments, when the UE does not support ENDC, then the UE performs a handover operation between cells in a non-enhanced fashion.

When the central server determines the UE is configured to support ENDC ("YES" branch of operation 302), the operation flow proceeds to operation 306. At operation 306, the central server determines, based on the UE capability for example, whether the UE supports at least one ENDC frequency band supported by the TN, such as TN 100.

Figure 4A:
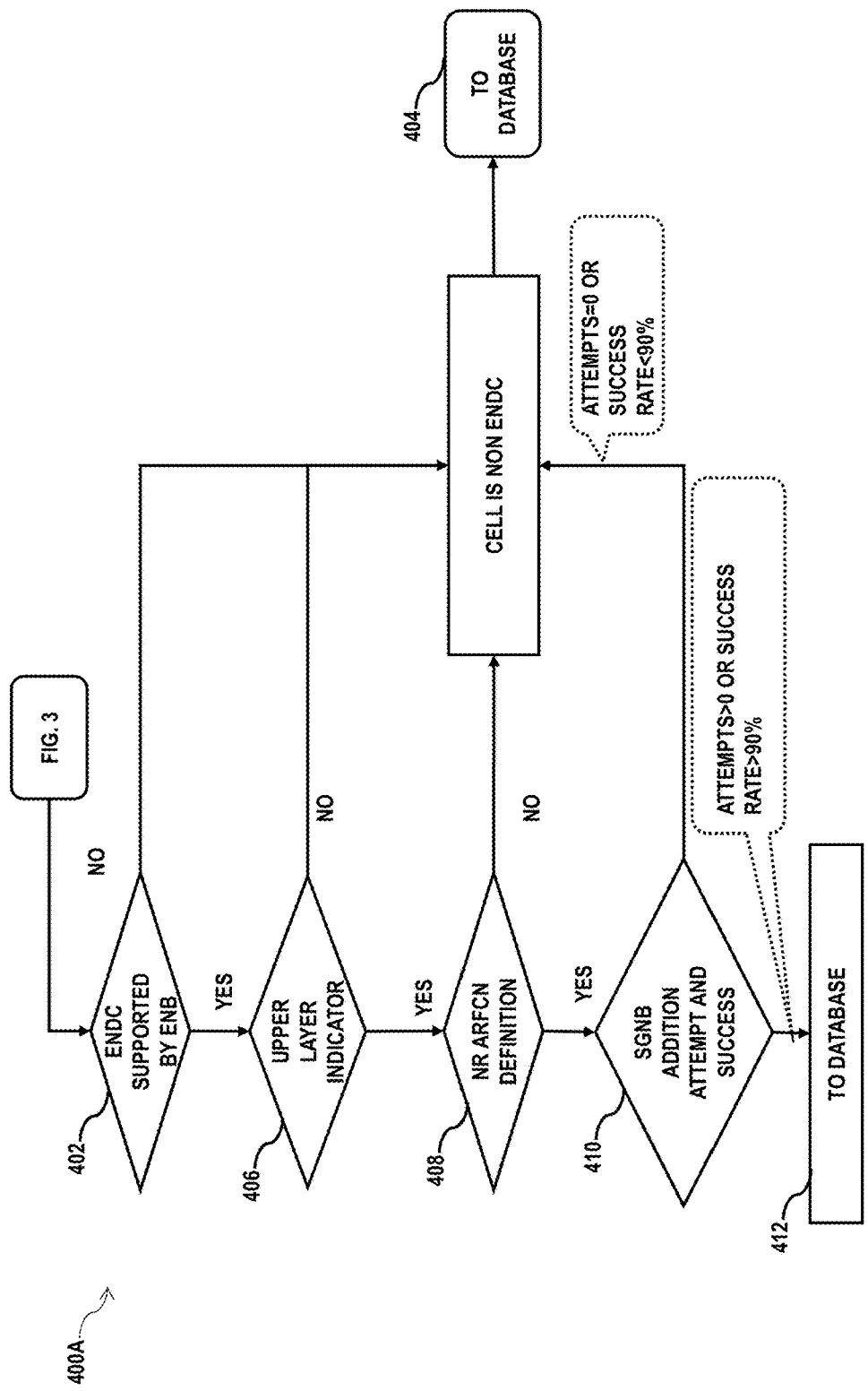
FIG. 4A is a flow diagram representation of a method determining ENDC enabled source and target cells, in accordance with some embodiments.

When the UE does support an ENDC frequency band ("YES" branch of operation 306) operation flows to a method for determining ENDC support for a source and target cell 400A (FIG. 4A). The central server determines whether the reference frequencies used for transmission and reception are supported by ENDC. In some embodiments, the UE is stored in a database for future reference when the user returns to the TN network.

When the UE does not support an ENDC frequency band ("NO" branch of operation 306) operation flows to operation 204 where the UE mobility is handled normally without handover modification. In some embodiments, if the UE does not support ENDC, then the UE performs a handover operation between cells in a non-enhanced fashion. In some embodiments, the UE is stored in a database for future reference when the user returns to the TN network.

FIG. 4A is a flow diagram representation of a method determining ENDC enabled source and target cells 400A, in accordance with some embodiments.

Method 400A is configured to be used to determine whether a cell, such as ENDC cells 104 or non-ENDC cells 106, supports ENDC. Method 400A is configured to be used in a heterogeneous network, such as TN 100, to determine whether cells support ENDC. The sequence in which the operations of method 400A are depicted in FIG. 4A is for illustration only; the operations of method 400A are capable of being executed in sequences that differ from that depicted in FIG. 4A. In some embodiments, operations in addition to those depicted in FIG. 4A are performed before, between, during, and/or after the operations depicted in FIG. 4A.

In some embodiments, one or more of the operations of method 400A are a subset of operations of a method of enhancing ENDC 200. In some embodiments, method 400A is a subset of operation 206 of method 200. In various embodiments, one or more of the operations of method 400A are performed by using one or more processors, e.g., a processor 902 discussed below with respect to enhanced ENDC processing circuitry 900 and FIG. 9.

At operation 402 of method 400A, the central server determines whether the cells, such as cells 102, within the TN, such as TN 100, support eNB. eNB handles radio communications with multiple devices and carries out radio resource management and handover decisions. When a cell supports eNB, then it supports fourth generation (4G) LTE. When a cell does not support eNB ("NO" branch of operation 402) operation flows to operation 404 where the central server stores the cell in a database of all cells in the TN and the cells capability.

When a cell does support eNB ("YES" branch of operation 402) operation flows to operation 406 where the central server determines whether an upper layer indictor is present. In some embodiments, a 1 bit NR indicator is added per public land mobile network (PLMN). The indicator is added to system information block type 2 (SIB2). SIB2 contains radio resource configuration information, such as, access barring information, radio resource configuration of common and shared channels, timers and constants which are used by UEs, and uplink power control information that is common for all UEs. The 1 bit NR indicator is the upper layer indicator. In some embodiments, the upper layer indication is set to true and indicates to the upper layers of the protocol stack that a cell is an ENDC cell.

When the upper layer indictor is not set to true or is missing ("NO" branch of operation 406) operation flow continues to operation 404 and the cell is placed in a database of eNB cells, such as database 112. When the upper layer is present or set to true ("YES" branch of operation 406) operation flow proceeds to operation 408 where the central server determines a NR ARFCN definition for the cell.

NR-ARFCN for 5G/New Radio is defined in the third generation partnership project (3GPP) specification, herein incorporated by reference in entirety, sections 38.101-1 and 38.101-2. The ARFCN specifies a pair of reference frequencies used for transmission and reception in the TN. In a frequency division duplex (FDD) system one ARFCN number is configured for downlink and another for uplink as downlink and uplink frequencies are different. In a time division duplex (TDD) system only one ARFCN number is enough as downlink and uplink frequency remains same. In some embodiments, when a cell is ENDC the ARFCN indicates ENDC supported frequencies.

At operation 408 of method 400A, when the ARFCN indicates a cell is not ENDC enabled ("NO" branch of operation 408), operation flow proceeds to operation 404 where the cell is stored as an eNB cell in a database, such as database 116, as a non-ENDC enabled eNB cell in the TN. When the ARFCN indicates a cell is ENDC enabled ("YES" branch of operation 408), operation flow proceeds to operation 410.

At operation 410 of method 400A, the ML algorithm determines a secondary gNodeB (SgNB) addition attempts and success rate. The purpose of the SgNB addition preparation procedure is to request the evolved next generation NodeB (en-gNB) to allocate resources for ENDC connectivity operation for a specific cell. en-gNB is discussed in the 3GPP Technical Specification 38.300 V15.1.0 (herein incorporated by reference in entirety).

In ENDC new radio dual connectivity, the 5G gNB connects to the 4G Core network. More specifically, the 4G eNB acts as a master node (MeNB) that is in control of the radio connection with the UE and the en-gNB is configured to be used as a secondary node (SgNB) supporting 5G. In this architecture the TN supports bitrates greater than other approaches to the UEs that support dual-connectivity without impact on the core infrastructure. For example, deployment of small cells to enhance the capacity of a macro cell (e.g., master eNB), where the UEs can be communication with two cells simultaneously (e.g., dual-connectivity).

In some embodiments, the central server will look for SgNB cells. When the central server makes at least one attempt or has an attempt success rate of greater than 90% in allocating a cell as a SgNB cell ("attempts>0 or success rate>90%" branch of operation 410), operation flow proceeds to operation 412 where the cell is stored in a database, such as database 114, storing ENDC enabled eNB cells. When the central server has no attempts or the success rate in attempts is lower than or equal to 90% ("attempts=0 or success rate<90%), operation flow moves to operation 404 and the central server stores the cell in a database, such as database 116, for all non-ENDC enabled eNB cells.

Figure 4B:
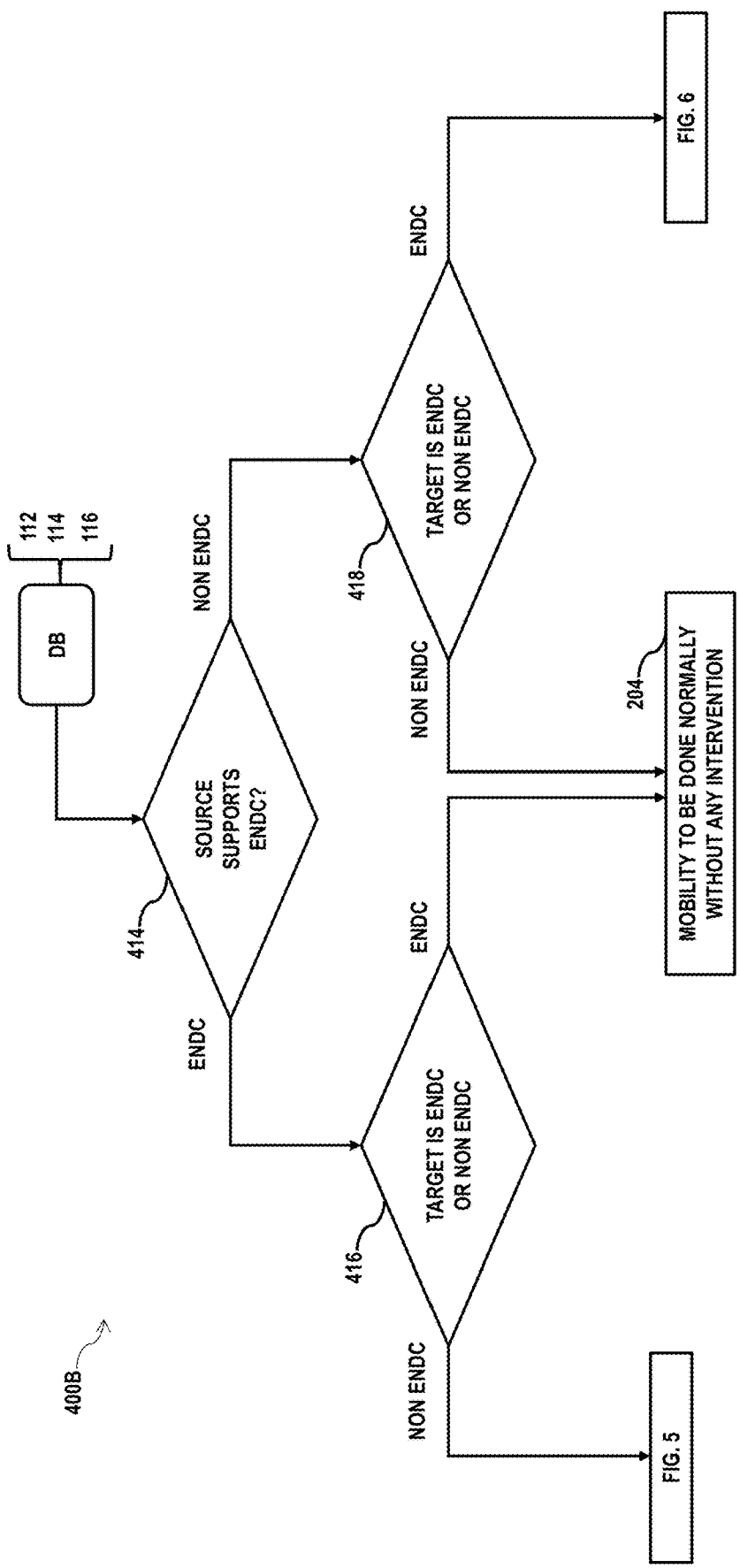
FIG. 4B is a flow diagram representation of a method determining enhanced mobility, in accordance with some embodiments.

FIG. 4B is a flow diagram representation of a method determining enhanced mobility 400B, in accordance with some embodiments.

Method 400B is configured to be used to determine whether the source and target cells support enhanced mobility. Method 400B is configured to be used in a heterogeneous network, such as TN 100, to determine whether the source and target cells support enhanced ENDC. The sequence in which the operations of method 400B are depicted in FIG. 4B is for illustration only; the operations of method 400B are capable of being executed in sequences that differ from that depicted in FIG. 4B. In some embodiments, operations in addition to those depicted in FIG. 4B are performed before, between, during, and/or after the operations depicted in FIG. 4B.

In some embodiments, one or more of the operations of method 400B are a subset of operations of a method of enhancing ENDC 200. In some embodiments, method 400B is a subset of operation 206 of method 200. In various embodiments, one or more of the operations of method 400B are performed by using one or more processors, e.g., a processor 902 discussed below with respect to enhanced ENDC processing circuitry 900 and FIG. 9.

At operation 414 of method 400B, the central server determines whether the source cell is an ENDC cell. In some embodiments, the central server, such as central server 110, accesses databases 112, 114, and/or 116 to determine whether the source cell supports ENDC. In some embodiments, method 400A is configured to determine whether the source cell supports ENDC. When the source cell does support ENDC ("ENDC" branch of operation 414) operation flows to operation 416 where the central server determines whether the target cell supports ENDC.

At operation 416 of method 400B, the central server determines whether the target cell is an ENDC cell. When the target cell supports ENDC ("ENDC" branch of operation 416) operation flows to operation 204 where mobility handover it performed in a standard manner without any mobility modification. When the target cell does not support ENDC ("NON-ENDC" branch of operation 416) operation flows to operation 502 of method 500 (FIG. 5) where a mobility first setting is determined.

When the source cell does not support ENDC ("NON-ENDC" branch of operation 414) operation flows to operation 418 where the central server determines whether the target cell supports ENDC. At operation 418 of method 400B, the central server determines whether the target cell is an ENDC cell. When the target cell does not support ENDC ("NON-ENDC" branch of operation 418) operation flows to operation 204 where mobility handover it performed in a standard manner without any mobility modification. When the target cell does support ENDC ("ENDC" branch of operation 418) operation flows to operation 602 of method 600 (FIG. 6) where a mobility second setting is determined.

Figure 5:
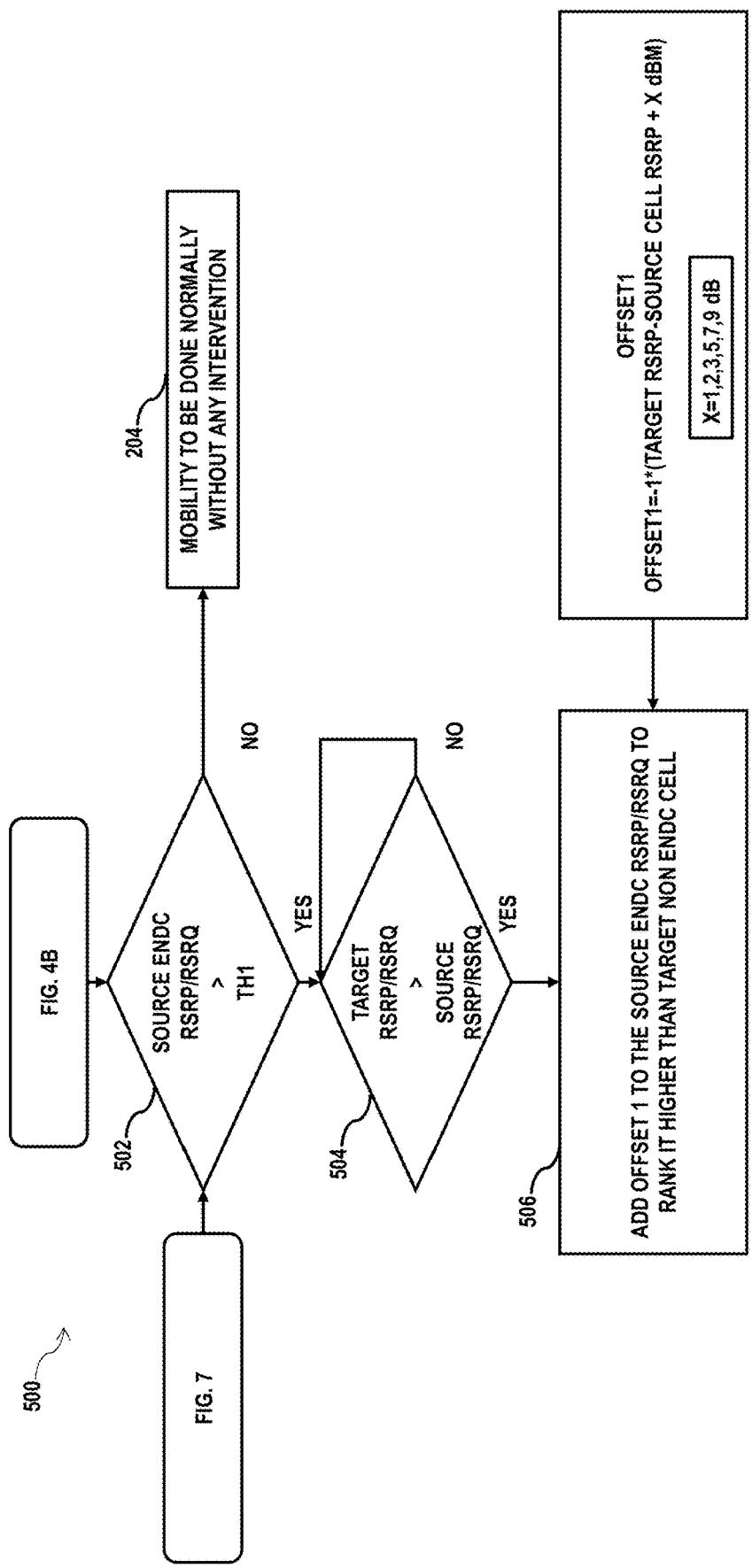
FIG. 5 is a flow diagram representation of a method of determining a mobility first setting, in accordance with some embodiments.

FIG. 5 is a flow diagram representation of a method of determining a mobility first setting 500, in accordance with some embodiments.

Method 500 is configured to be used to determine a mobility first setting. Method 500 is configured to be used in a heterogeneous network, such as TN 100, to determine a mobility first setting. The sequence in which the operations of method 500 are depicted in FIG. 5 is for illustration only; the operations of method 500 are capable of being executed in sequences that differ from that depicted in FIG. 5. In some embodiments, operations in addition to those depicted in FIG. 5 are performed before, between, during, and/or after the operations depicted in FIG. 5.

In some embodiments, one or more of the operations of method 500 are a subset of operations of a method of enhancing ENDC 200. In some embodiments, method 500 is a subset of operation 210 of method 200. In various embodiments, one or more of the operations of method 500 are performed by using one or more processors, e.g., a processor 902 discussed below with respect to enhanced ENDC processing circuitry 900 and FIG. 9.

At operation 502 of method 500, the central server determines whether the reference signal received power (RSRP) over the reference signal received quality (RSRQ) (e.g., a ratio of signal strength to signal quality) for the source cell is greater than first threshold. RSRP is a measurement of the average received power of the power received from a single reference signal level in an LTE cell network. RSRQ is the ratio of the carrier power to the interference power. In some embodiments, RSRQ is a signal-noise ratio measured using a standard signal. A connection with a high RSRQ should be good, even if the RSRP is low (i.e., the cell is able to extract the information in the weak signal because of minimal noise). In some embodiments, a ratio higher than 1:1 (or a ratio of 1 and greater than 0 dB) indicates more signal than noise.

In some embodiments, the central server, determines a source cell's RSRP and RSRQ. In some embodiments, the central server accesses databases where the RSRP and RSRQ are stored. When the source cell's ratio of RSRP over RSRQ is not greater than a first threshold (TH1) ("NO" branch of operation 502) operation flows to operation 204 where mobility handover is handled in a standard manner as the source cell's RSRP over RSRQ ratio is poor and another source cell is needed. In some embodiments, TH1 is configured by the ML algorithm. In some embodiments, limits for TH1 is set (e.g., −115 dBm). In some embodiments, dBm or dBmW (i.e., decibel-milliwatts) is a unit of level used to indicate that a power level is expressed in decibels (dB) with reference to one milliwatt (mW).

When the source cell's ratio of RSRP over RSRQ is greater than TH1 ("YES" branch of operation 502) operation flows to operation 504 where the central server determines the target cell's RSRP over RSRQ ratio. When the target cell's ratio of RSRP over RSRQ is not greater than the source cell's ratio of RSRP over RSRQ ("NO" branch of operation 504) operation flows back to operation 504 until the target cell's RSRP over RSRQ ratio is greater than the RSRP over RSRQ ratio of the source cell. In some embodiments, the iterative operation will continue until a new target cell is discovered. In some embodiments, the mobility handover is handled in a standard manner without intervention.

When the target cell's ratio of RSRP over RSRQ is greater than the source cell's ratio of RSRP over RSRQ ("YES" branch of operation 504) operation flows to operation 506 where an offset 1 is added to the source RSRP over RSRQ ratio to rank the source cell above the target cell for purposes of a handover operation. In some embodiments, this operation delays any handover to the target cell and keeps the UE on the ENDC source cell for a longer time period.

In some embodiments, offset 1 is determined by equation 1. Where X is a positive integer. In some embodiments, X is from the set of {1, 2, 3, 5, 7, 9}. In some embodiments, method 500 is an iterative process where X is incremented through the set {1, 2, 3, 5, 7, 9} from 1 to 9. In some embodiments, the ML algorithm sets X based upon learned patterns and acquired data.

$$\text{Offset } 1 = -1*(\text{target cell RSRP} - \text{source cell RSRP} + X \text{ dbm}) \qquad \text{eq. 1}$$

Figure 6:
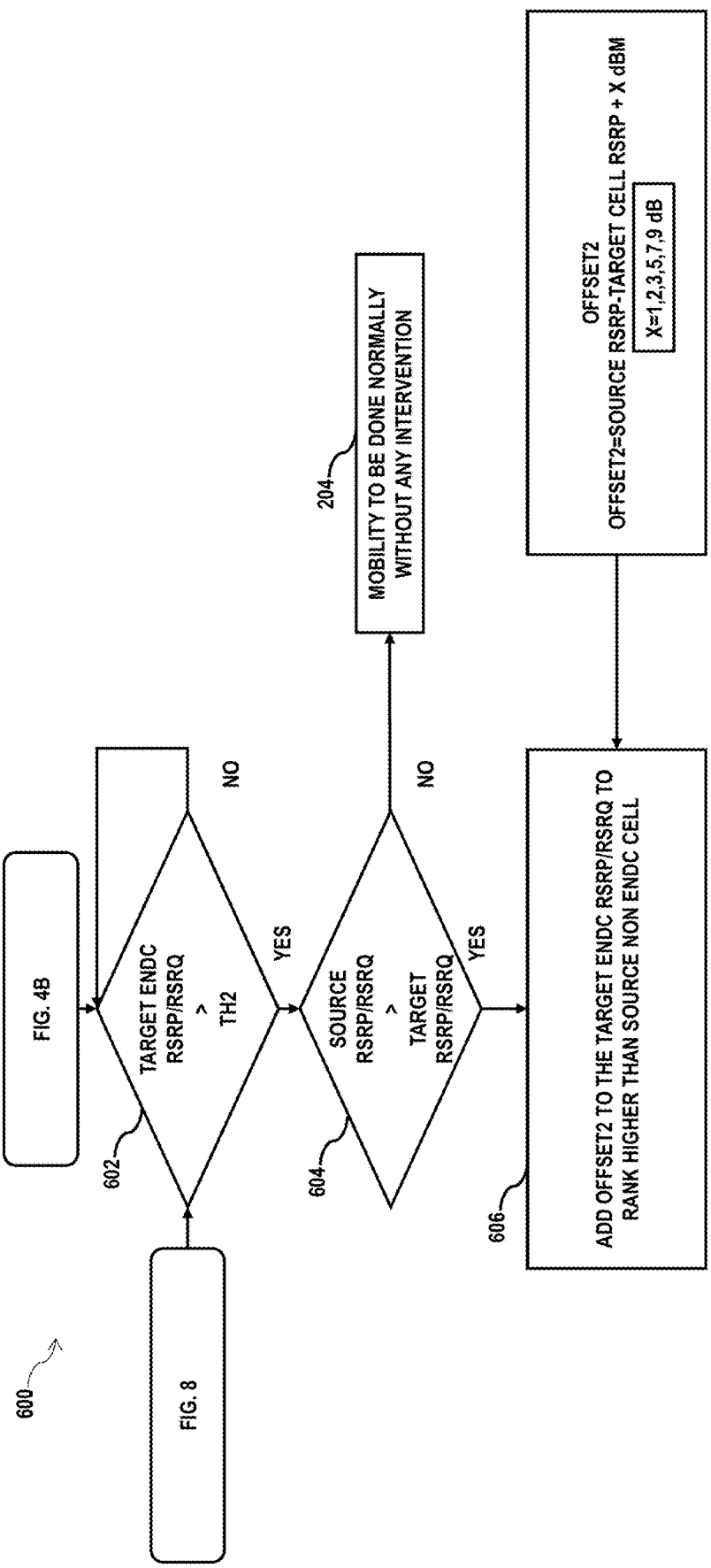
FIG. 6 is a flow diagram representation of a method of determining a mobility second setting, in accordance with some embodiments.

FIG. 6 is a flow diagram representation of a method of determining a mobility second setting 600, in accordance with some embodiments.

Method 600 is configured to be used to determine a mobility second setting. Method 600 is configured to be used in a heterogeneous network, such as TN 100, to determine a mobility second setting. The sequence in which the operations of method 600 are depicted in FIG. 6 is for illustration only; the operations of method 600 are capable of being executed in sequences that differ from that depicted in FIG. 6. In some embodiments, operations in addition to those depicted in FIG. 6 are performed before, between, during, and/or after the operations depicted in FIG. 6.

In some embodiments, one or more of the operations of method 600 are a subset of operations of a method of enhancing ENDC 200. In some embodiments, method 600 is a subset of operation 214 of method 200. In various embodiments, one or more of the operations of method 600 are performed by using one or more processors, e.g., a processor 902 discussed below with respect to enhanced ENDC processing circuitry 900 and FIG. 9.

At operation 602 of method 600, the central server determines whether the RSRP over RSRQ ratio for a target cell is greater than second threshold (TH2). In some embodiments, the central server, determines a target cell's RSRP and RSRQ. In some embodiments, the central server accesses databases where the target cell's RSRP and RSRQ are stored. When the target cell's ratio of RSRP over RSRQ is not greater than a TH2 ("NO" branch of operation 602) operation flows back to operation 602 until the target cell RSRP over RSRQ ratio is greater than TH2. In some embodiments, when the target cell RSRP over RSRQ ratio is not greater than TH2 the mobility handover is handled in a standard manner as the target cell's RSRP over RSRQ ratio is poor and another target cell is needed. In some embodiments, TH2 is determined by the ML algorithm. In some embodiments, limits for TH2 is set (e.g., −115 dBm).

When the target cell's ratio of RSRP over RSRQ is greater than TH2 ("YES" branch of operation 602) operation flows to operation 604 where the central server determines the source cell's RSRP over RSRQ ratio. When the source cell's ratio of RSRP over RSRQ is less than the target cell's ratio of RSRP over RSRQ ("NO" branch of operation 504) operation flows to operation 204 where the mobility handover is handled in a standard manner without any intervention. In some embodiments, because the source's RSRP over RSRQ ratio is below the target RSRP over RSRQ ratio, a handover will commence instantly as the source signal quality is so poor.

When the source cell's ratio of RSRP over RSRQ is greater than the target cell's ratio of RSRP over RSRQ ("YES" branch of operation 604) operation flows to operation 606 where an offset 2 is added to the target RSRP over RSRQ ratio to rank the target cell above the source cell for purposes of a handover operation. In some embodiments, this operation speeds up any handover to the target cell and removes the UE from the non-ENDC source cell.

In some embodiments, offset 2 is determined by equation 2. Where X is a positive integer. In some embodiments, X is from the set of {1, 2, 3, 5, 7, 9}. In some embodiments, method 600 is an iterative process where X is incremented through the set {1, 2, 3, 5, 7, 9} from 1 to 9. In some embodiments, the ML algorithm sets X based on learned information.

$$\text{Offset 2} = (\text{source cell RSRP} - \text{target cell RSRP} + X \text{ dbm})  \quad \text{eq. 2}$$

Figure 7:
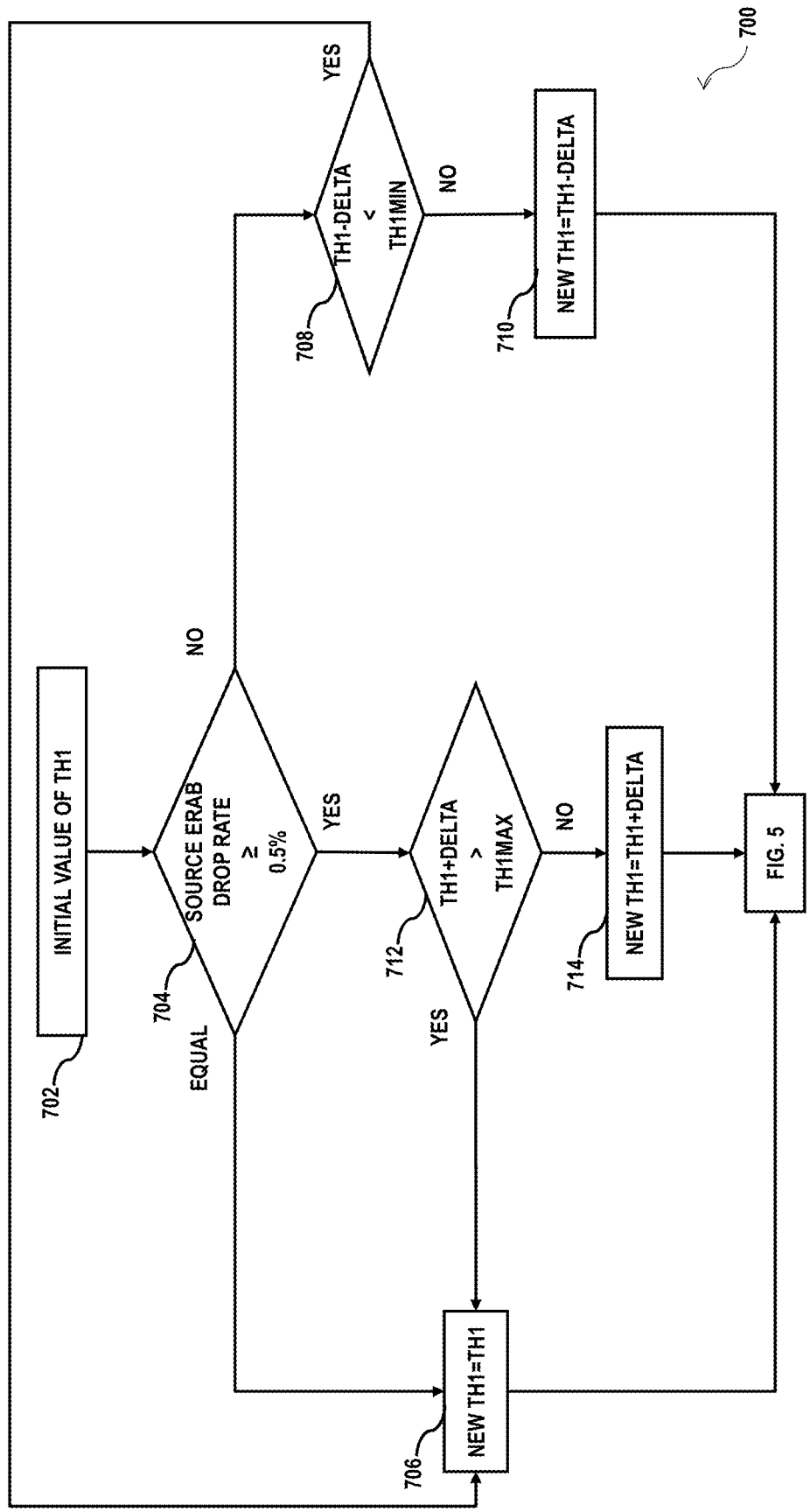
FIG. 7 is a flow diagram representation of a method of determining a first threshold value, in accordance with some embodiments.

FIG. 7 is a flow diagram representation of a method of determining a first threshold value 700, in accordance with some embodiments.

Method 700 is configured to be used to determine a first threshold. Method 700 is configured to be used in a heterogeneous network, such as TN 100, to determine a first threshold. The sequence in which the operations of method 700 are depicted in FIG. 7 is for illustration only; the operations of method 700 are capable of being executed in sequences that differ from that depicted in FIG. 7. In some embodiments, operations in addition to those depicted in FIG. 7 are performed before, between, during, and/or after the operations depicted in FIG. 7.

In some embodiments, one or more of the operations of method 700 are a subset of operations of a method of enhancing ENDC 200. In some embodiments, method 700 is a subset of operation 208 (e.g., determining a mobility first setting) of method 200. In various embodiments, one or more of the operations of method 700 are performed by using one or more processors, e.g., a processor 902 discussed below with respect to enhanced ENDC processing circuitry 900 and FIG. 9.

At operation 702 of method 700, an initial value of TH1 is set. In some embodiments, TH1 is set by the OEM. In some embodiments, TH1 is set by the host operator of the TN. In some embodiments, TH1 is set by the user. In some embodiments, TH1 is set by the ML algorithm upon first detection of the UE by the ML algorithm.

From operation 702 of method 700, operation flow proceeds to operation 704 where the central server determines whether the source cell E-UTRAN Radio Access Bearer (ERAB) drop rate is greater than or equal to 0.5%. ERAB is a parameter in LTE key performance indicator (KPI) analysis. ERAB is formed by combining the S1 bearer and the corresponding radio bearer. The S1 bearer connects the eNB radio cell with a serving gateway. Handover establishes a new S1 bearer for end-to-end connectivity. The radio bearer connects the UE to the eNB. The radio bearer follows the user under the direction of the mobile management entity (MME) as the TN performs handovers when the user moves from one cell to another.

The E-RAB ID parameter is used to determine the ERAB on the S1 interface. In the TN, there are values that affect the quality of service, such as bit error rate and the end to end delay (latency). These values define the quality-of-service class identifier (QCI) in LTE. QCI is a mechanism used in 3GPP LTE networks to ensure bearer traffic is allocated appropriate. Different bearer traffic requires different quality of service and therefore different QCI values. In some embodiments, QCI value 9 is typically used for the default bearer of a UE/PDN for non-privileged subscribers.

At operation 704 when the combination of the S1 bearer with the radio bearer is equal to 0.5% ("EQUAL" branch of operation 704), meaning the ERAB drop rate is equal to 0.5%, operation proceeds to operation 706. At operation 706 the initial TH1 remains TH1. Operational flow then proceeds to operation 502 of method 500 where TH1 is configured to be used to determine whether the source cell RSRP/RSRQ is greater than TH1.

At operation 704 when the ERAB drop rate is less than to 0.5% ("NO" branch of operation 704), operation proceeds to operation 708. At operation 708 the central server (or the ML algorithm) lowers TH1 by a delta ($\Delta_1$) value from TH1. The central server further determines whether the new TH1−$\Delta_1$ value is less than a TH1 minimum (e.g., −115 dBm).

When the TH1−$\Delta_1$ value is less than the TH1 minimum ("YES" branch of block 708), operation flows to operation 706 where the initial TH1 is set as the new TH1. In some embodiments, the threshold (TH1) does not drop below a threshold minimum (TH1 min). In some embodiments, the original or initial TH1 value is configured to be used to prevent a threshold adjustment of operation 708 from dropping below a threshold minimum.

When the TH1−$\Delta_1$ value is greater than the TH1 minimum ("NO" branch of block 708), operation flows to operation 710. At operation 710, a new TH1 is set at the value of the initial TH1 less the $\Delta_1$ value. In some embodiments, the $\Delta_1$ value is determined by the ML algorithm. In some embodiments, the $\Delta_1$ value is determined by the user. When the new TH1 value is set, operation flows to operation 502 of method 500.

At operation 704 when the ERAB drop rate is greater than to 0.5% ("YES" branch of operation 704), operation proceeds to operation 712. At operation 712 the central server (or the ML algorithm) raises TH1 by the delta ($\Delta_1$) value from the initial TH1. The central server further determines whether the new TH1+$\Delta_1$ value is greater than a TH1 maximum (e.g., 30 dBm).

When the TH1+$\Delta_1$ value is greater than the TH1 maximum value ("YES" branch of block 712), operation flows to operation 706 where the initial TH1 is set as the new TH1. In some embodiments, the threshold (TH1) does rise above a threshold maximum (TH1 max). In some embodiments, the original or initial TH1 value is configured to be used to prevent the threshold adjustment of operation 712 from rising above a threshold maximum.

When the TH1+$\Delta_1$ value is less than the TH1 maximum ("NO" branch of block 712), operation flows to operation 714. At operation 714, a new TH1 value is set at the value of the initial TH1 plus the $\Delta_1$ value. When the new TH1 value is set, operation flows to operation 502 of method 500.

Figure 8:
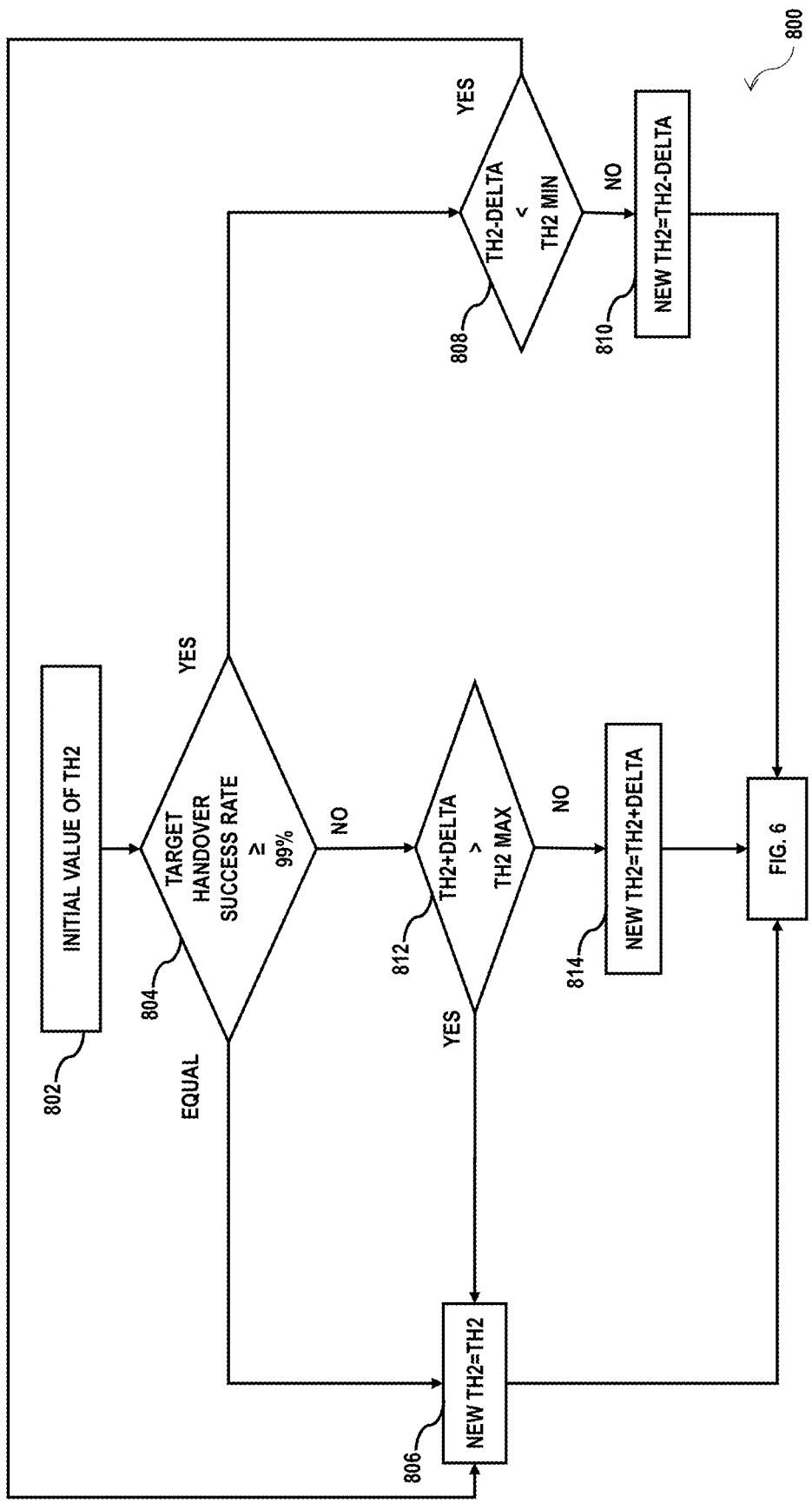
FIG. 8 is a flow diagram representation of a method of determining a second threshold value, in accordance with some embodiments.

FIG. 8 is a flow diagram representation of a method of determining a second threshold value 800, in accordance with some embodiments.

Method 800 is configured to be used to determine a second threshold. Method 800 is configured to be used in a heterogeneous network, such as TN 100, to determine a second threshold. The sequence in which the operations of method 800 are depicted in FIG. 8 is for illustration only; the operations of method 800 are capable of being executed in sequences that differ from that depicted in FIG. 8. In some embodiments, operations in addition to those depicted in FIG. 8 are performed before, between, during, and/or after the operations depicted in FIG. 8.

In some embodiments, one or more of the operations of method 800 are a subset of operations of a method of enhancing ENDC 200. In some embodiments, method 800 is a subset of operation 212 (e.g., determining a mobility second setting) of method 200. In various embodiments, one or more of the operations of method 800 are performed by using one or more processors, e.g., a processor 902 discussed below with respect to enhanced ENDC processing circuitry 900 and FIG. 9.

At operation 802 of method 800, an initial value of TH2 is set. In some embodiments, TH2 is set by the OEM. In some embodiments, TH2 is set by the host operator of the TN. In some embodiments, TH2 is set by the user. In some embodiments, TH2 is set by the ML algorithm upon first detection of the UE by the ML algorithm.

From operation 802 of method 800, operation flow proceeds to operation 804 where the central server determines whether the target cell handover success rate is greater than or equal to 99%. In some embodiments, the handover success rate indicates the target cell has greater than, less than or equal to executing a successful handover 99 times out of 100. In some embodiments, the success rate is 999 times out of 1,000. In some embodiments, the success rate is 9999 time out of 10,000

At operation 804 when the target cell handover success rate is equal to 99% ("EQUAL" branch of operation 804), operation flows to operation 806. At operation 806 the initial TH2 value remains the new TH2 value. Operational flow then proceeds to operation 602 of method 600 where the new TH2 value is configured to be used to determine whether the target cell RSRP/RSRQ is greater than TH2. In some embodiments, the new TH2 value ensures the target cell success rate remains high, even in enhanced ENDC mode.

At operation 804 when the target handover success rate is greater than to 99% ("YES" branch of operation 804), operation proceeds to operation 808. At operation 808 the central server (or the ML algorithm) lowers TH2 by a delta ($\Delta_2$) value from the initial TH2 value. The central server further determines whether the new TH2–$\Delta_2$ value is less than a TH2 minimum (e.g., –115 dBm). In some embodiments, $\Delta_2$ is different from $\Delta_1$. In some embodiments, $\Delta_2$ is the same or similar to $\Delta_1$. In some embodiments, $\Delta_2$ is greater than $\Delta_1$. In some embodiments, $\Delta_2$ is less than $\Delta_1$.

When the TH2–$\Delta_2$ value is less than a TH2 minimum ("YES" branch of block 808), operation flows to operation 806 where the initial TH2 is set as the new TH2 value. In some embodiments, the threshold (TH2) does not drop below a threshold minimum (TH2 min). In some embodiments, the original or initial TH2 value is configured to be used to prevent a threshold adjustment of operation 808 from dropping below a threshold minimum.

When the TH1–$\Delta_2$ value is greater than the TH2 minimum ("NO" branch of block 808), operation flows to operation 810. At operation 810, a new TH2 value is set at the value of the initial TH2 less the $\Delta_2$ value. In some embodiments, the $\Delta_2$ value is determined by the ML algorithm. In some embodiments, the $\Delta_2$ value is determined by the user. When the new TH2 value is set, operation flows to operation 602 of method 600.

At operation 804 when target cell handover success rate is less than to 99% ("NO" branch of operation 804), operation proceeds to operation 812. At operation 812 the central server (or the ML algorithm) raises TH2 by the delta ($\Delta_2$) value from the initial TH2. The central server further determines whether the new TH2+$\Delta_2$ value is greater than a TH2 maximum (e.g., 30 dBm).

When the TH2+$\Delta_2$ value is greater than the TH2 maximum value ("YES" branch of block 812), operation flows to operation 806 where the initial TH2 value is set as the new TH2 value. In some embodiments, the threshold (TH2) does rise above a threshold maximum (TH2 max). In some embodiments, the original or initial TH2 value is configured to be used to prevent a threshold adjustment from rising above a threshold maximum.

When the TH2+$\Delta_2$ value is less than the TH2 maximum ("NO" branch of block 812), operation flows to operation 814. At operation 814, a new TH2 value is set at the value of the initial TH2 plus the $\Delta_2$ value. When the new TH2 value is set, operation flows to operation 602 of method 600.

FIG. 9 is a block diagram of computing system 900 in accordance with some embodiments. In some embodiments, computing system 900 is a general purpose computing device including a hardware processing circuitry 902 and a non-transitory, computer-readable storage medium 904. Storage medium 904, amongst other things, is encoded with, i.e., stores, computer program code 906, i.e., a set of executable instructions to cause processing circuitry 902 to perform operations, such as those of methods 200, 300, 400A, 400B, 500, 600, 700, and 800. Execution of instructions 906 by hardware processing circuitry 902 represents (at least in part) tools which implement a portion or all of the methods described herein in accordance with one or more embodiments (hereinafter, the noted processes and/or methods).

Processing circuitry 902 is electrically coupled to a computer-readable storage medium 904 via a bus 908. Processing circuitry 902 is also be electrically coupled to an I/O interface 910 by bus 908. A network interface 912 is also electrically connected to processing circuitry 902 via bus 908. Network interface 912 is connected to a network 914, so that processing circuitry 902 and computer-readable storage medium 904 are capable of connecting to external elements via network 914. Processing circuitry 902 is configured to execute computer program code 906 encoded in computer-readable storage medium 904 in order to cause coverage hold computing system 900 to be usable for performing a portion or all of the noted processes and/or methods. In one or more embodiments, processing circuitry 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause computing system 900 to be usable for performing a portion or all of the noted processes and/or methods. In one or more embodiments, storage medium 904 also stores information, such as ML algorithm which facilitates performing a portion or all of the noted processes and/or methods. In one or more embodiments, storage medium 904 stores parameters.

Computing system 900 includes I/O interface 910. I/O interface 910 is coupled to external circuitry. In one or more embodiments, I/O interface 910 includes a keyboard, keypad, mouse, trackball, trackpad, touchscreen, and/or cursor direction keys for communicating information and commands to processing circuitry 902.

Computing system 900 is also include network interface 912 coupled to processing circuitry 902. Network interface 912 allows computing system 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more computing system 900.

Computing system 900 is configured to receive information through I/O interface 910. The information received through I/O interface 910 includes one or more of instructions, data, design rules, libraries of standard cells, and/or other parameters for processing by processing circuitry 902. The information is transferred to processing circuitry 902 via bus 908. Computing system 900 is configured to receive information related to a UI through I/O interface 910. The information is stored in computer-readable medium 904 as user interface (UI) 918.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

A system of one or more computers are configured to perform particular operations or actions by virtue of having software, firmware, hardware, or a combination of them installed on the system that in operation causes or cause the system to perform the actions. One or more computer programs are configured to perform particular operations or actions by virtue of including instructions that, when executed by data processing apparatus, cause the apparatus to perform the actions. In some embodiments, a method includes determining whether user equipment (UE) 118 in a telecommunication network is configured to support evolved universal terrestrial radio access network dual connectivity (ENDC). Responsive to the UE 118 being determined as configured to support the ENDC determining whether a source cell and a target cell are configured to support the ENDC. The method further includes performing on processing circuitry a first mobility modification in response to determining the source cell is an ENDC source cell and the target cell is a non-ENDC target cell. The method further includes performing on the processing circuitry a second mobility modification in response to determining the target cell is an ENDC target cell and the source cell is a non-ENDC source cell. The second mobility modification is different from the first mobility modification. The method further includes performing a handover from the source cell to the target cell in response to both the source cell and the target cell being configured for ENDC or non-ENDC. Other embodiments of this aspect include corresponding computer systems, apparatus, and computer programs recorded on one or more computer storage devices, each configured to perform the actions of the methods.

Implementations may include one or more of the following features. The method where the determining whether the source cell and the target cell are configured to support the ENDC includes determining whether the source cell is configured to support evolved NodeB (eNB); determining whether the source cell is configured with an upper layer indicator. The method further includes determining whether the source cell is configured with an absolute radio-frequency channel number (ARFCN). The method further includes determining whether the source cell has a secondary gNodeB (SgNB) addition attempt is greater than zero or a success rate greater than 90%. The determining whether the source cell and the target cell are configured to support the ENDC includes determining whether the target cell is configured to support ENDC after the source cell is determined to be configured for ENDC. The performing the first mobility modification includes determining whether a source cell ratio of a reference signal received power (RSRP) to a reference signal received quality (RSRQ) is greater than a first threshold. The method further includes determining whether a target cell ratio of RSRP/RSRQ is greater than the source cell ratio of RSRP/RSRQ. The method further includes adding an offset to the source cell ratio of RSRP/RSRQ to rank the source cell higher than the target cell. The offset is represented by an equation (−1(a target cell RSRP−a source cell RSRP+x dBm)); where X is 1, 2, 3, 5, 7, or 9. The method includes initializing a first threshold. Determining an evolved universal terrestrial radio access network radio access bearer (ERAB) drop rate of the source cell. Setting a new first threshold as the initial first threshold responsive to the ERAB drop rate being equal to 0.5%. Determining whether the initial first threshold combined with a delta value is greater than a maximum first threshold responsive to the ERAB drop rate being greater than 0.5%. Setting the new first threshold as the initial first threshold responsive to the initial first threshold combined with the delta value being greater than a maximum first threshold. Setting the new first threshold as the initial first threshold combined with the delta value responsive to the initial first threshold combined with the delta value being less than the maximum first threshold. Determining whether the initial first threshold decreased by the delta value is less than a minimum first threshold responsive to the ERAB drop rate being less than 0.5%. Setting the new first threshold at the initial first threshold responsive to the initial first threshold decreased by the delta value being less than a minimum first threshold. Setting the new first threshold as the initial first threshold decreased by the delta value responsive to the initial first threshold decreased by the delta value being greater than the minimum first threshold. The performing the second mobility modification includes determining whether a target cell ratio RSRP/RSRQ is greater than a second threshold. Determining whether a source cell ratio RSRP/RSRQ is greater than the target cell ratio RSRP/RSRQ. The method further includes adding an offset to the target cell ratio RSRP/RSRQ to rank the target cell higher than the source cell. The offset is represented by an equation (a source cell RSRP−a target cell RSRP+x dBm); where X is 1, 2, 3, 5, 7, or 9. The method includes initializing a second threshold. Determining a handover success rate of the target cell. Setting a new second threshold at the initial second threshold responsive to the handover success rate being equal to 99%. Determining whether the initial second threshold combined with a delta value is greater than a maximum second threshold responsive to the handover success rate being less than 99%. Setting the new second threshold as the initial second threshold responsive to the initial second threshold combined with the delta value being greater than the maximum second threshold. Setting the new second threshold as the initial second threshold combined with the delta value responsive to the initial second threshold combined with the delta value being less than the maximum second threshold. Determining whether the initial second threshold decreased by the delta value is less than a minimum threshold responsive to the handover success rate being greater than 99%. Setting the new second threshold at the initial second threshold responsive to the initial second threshold decreased by the delta value being less than a minimum second threshold. Setting the new second threshold as the initial second threshold decreased by the delta value responsive to the initial second threshold decreased by the delta value being greater than the minimum second threshold. Implementations of the described techniques may include hardware, a method or process, or computer software on a computer-accessible medium.

In some embodiments, a system includes processing circuitry. The system further includes a memory connected to the processing circuitry, where the memory is configured to store executable instructions that, when executed by the processing circuitry, facilitate performance of operations. The operations including determining whether user equipment (UE) in a telecommunication network is configured to support evolved universal terrestrial radio access network dual connectivity (ENDC). Responsive to the UE being determined as configured to support the ENDC, determine whether a source cell and a target cell are configured to support the ENDC. The operations further including to perform on the processing circuitry a first handover modification in response to the source cell being an ENDC source cell and the target cell being a non-ENDC target cell. The operations further including to perform a second handover modification in response to the target cell being an ENDC target cell and the source cell being a non-ENDC source cell. The second handover modification is different from the first handover modification. The operations further including to perform a non-modified handover from the source cell to the target cell in response to both the source cell and the target cell being configured for ENDC or both the source cell and the target cell being configured for non-ENDC. Other embodiments of this aspect include corresponding computer systems, apparatus, and computer programs recorded on one or more computer storage devices, each configured to perform the actions of the methods.

Implementations may include one or more of the following features. The system where the performance of operations, includes determining whether the source cell and the target cell are configured to support evolved NodeB (eNB). Determine whether the source cell and the target cell are configured with an upper layer indicator. Determine whether the source cell and the target cell are configured with an absolute radio-frequency channel number (ARFCN). Determine whether the source cell and the target cell has a secondary gNodeB (SgNB) addition attempt greater than zero or a success rate greater than 90%. The performance of operations, includes determining whether the target cell is configured to support ENDC after the source cell is determined to be configured for ENDC. The performance of the first handover modification includes determining whether a dividend of reference signal received power (RSRP) over reference signal received quality (RSRQ) for the source cell is greater than a first threshold; determine whether the RSRP/RSRQ dividend for the target cell is greater than an source cell RSRP/RSRQ dividend; and add a first offset to the source cell RSRP/RSRQ dividend to rank the source cell higher than the target cell in a handover process. The first offset is represented by an equation: −1(a target cell RSRP a source cell RSRP+x dBm). Implementations of the described techniques may include hardware, a method or process, or computer software on a computer-accessible medium.

In some embodiments, a method includes determining whether user equipment (UE) in a telecommunication network is configured to support evolved universal terrestrial radio access network dual connectivity (ENDC). Responsive to the UE being determined as configured to support the ENDC, determining whether a source cell and a target cell are configured to support the ENDC. The method further includes performing on processing circuitry a first handover modification in response to the source cell being an ENDC source cell and the target cell being a non-ENDC target cell. Performing on the processing circuitry a second handover modification in response to the target cell being an ENDC target cell and the source cell being a non-ENDC source cell. The second handover modification is different from the first handover modification. Performing a non-modified handover from the source cell to the target cell in response to both the source cell and the target cell being configured for ENDC or both the source cell and the target cell being configured for non-ENDC. Other embodiments of this aspect include corresponding computer systems, apparatus, and computer programs recorded on one or more computer storage devices, each configured to perform the actions of the methods.

Implementations may include one or more of the following features. The method includes determining whether the source cell is configured to support evolved NodeB (eNB). Determining whether the source cell is configured with an upper layer indicator. Determining whether the source cell is configured with an absolute radio-frequency channel number (ARFCN). Determining whether the source cell has a secondary gNodeB (SgNB) addition attempt greater than zero or a success rate greater than 90%. The method includes determining whether the target cell is configured to support evolved NodeB (eNB). Determining whether the target cell is configured with an upper layer indicator. Determining whether the target cell is configured with an absolute radio-frequency channel number (ARFCN). Determining whether the target cell has a secondary gNodeB (SgNB) addition attempt greater than zero or a success rate greater than 90%. Implementations of the described techniques may include

What is claimed is:

1. A method, performed by a central server, comprising:
   determining whether user equipment (UE) in a telecommunication network is configured to support evolved universal terrestrial radio access network dual connectivity (ENDC);
   responsive to the UE being determined as configured to support the ENDC, determining whether a source cell and a target cell are configured to support the ENDC; and
   performing at least one of:
   a first handover mobility modification in response to determining the source cell is an ENDC source cell and the target cell is a non-ENDC target cell,
   a second handover mobility modification in response to determining the target cell is an ENDC target cell and the source cell is a non-ENDC source cell, wherein the second handover mobility modification is different from the first handover mobility modification, and
   a handover from the source cell to the target cell in response to both the source cell and the target cell being configured for ENDC or both the source cell and the target cell being configured for non-ENDC.

2. The method of claim 1, wherein the determining whether the source cell and the target cell are configured to support the ENDC comprises:
   determining whether the source cell is configured to support evolved NodeB (eNB);
   determining whether the source cell is configured with an upper layer indicator;
   determining whether the source cell is configured with an absolute radio-frequency channel number (ARFCN); and
   determining whether the source cell has a secondary gNodeB (SgNB) addition attempt greater than zero or a success rate greater than 90%.

3. The method of claim 1, wherein the determining whether the source cell and the target cell are configured to support the ENDC comprises:
   determining whether the target cell is configured to support ENDC after the source cell is determined to be configured for ENDC.

4. The method of claim 1, wherein the performing the first handover mobility modification comprises:
   determining whether a source cell ratio of reference signal received power (RSRP) to a reference signal received quality (RSRQ) is greater than a first threshold;
   determining whether a target cell ratio of RSRP/RSRQ is greater than the source cell ratio of RSRP/RSRQ; and
   adding an offset to the source cell ratio of RSRP/RSRQ to rank the source cell higher than the target cell in a handover process, when the target cell ratio of RSRP/RSRQ is greater than the source cell ratio of RSRP/RSRQ.

5. The method of claim 4, wherein the offset is represented by an equation:

$$-1(\text{target cell RSRP} - \text{a source cell RSRP} + X \text{ dBm}).$$

6. The method of claim 5, wherein X is 1, 2, 3, 5, 7, or 9.

7. The method of claim 4, wherein the performing the first handover mobility modification further comprising at least one of:
   initializing an initial first threshold;
   determining an evolved universal terrestrial radio access network radio access bearer (ERAB) drop rate of the source cell;
   setting a new first threshold as the initial first threshold responsive to the ERAB drop rate being equal to 0.5%;
   determining whether the initial first threshold combined with a Delta value is greater than a maximum first threshold responsive to the ERAB drop rate being greater than 0.5%;
   setting the new first threshold as the initial first threshold responsive to the initial first threshold combined with the Delta value being greater than a maximum first threshold;
   setting the new first threshold as the initial first threshold combined with the Delta value responsive to the initial first threshold combined with the Delta value being less than the maximum first threshold;
   determining whether the initial first threshold decreased by the Delta value is less than a minimum first threshold responsive to the ERAB drop rate being less than 0.5%;
   setting the new first threshold at the initial first threshold responsive to the initial first threshold decreased by the Delta value being less than a minimum first threshold; and
   setting the new first threshold as the initial first threshold decreased by the Delta value responsive to the initial first threshold decreased by the Delta value being greater than the minimum first threshold.

8. The method of claim 1, wherein the performing the second handover mobility modification comprises:
   determining whether a target cell ratio of RSRP/RSRQ is greater than a second threshold;
   determining whether a source cell ratio of RSRP/RSRQ is greater than the target cell ratio of RSRP/RSRQ; and
   adding an offset to the target cell ratio RSRP/RSRQ to rank the target cell higher than the source cell in a handover process, when the source cell ratio of RSRP/RSRQ is greater than the target cell ratio of RSRP/RSRQ.

9. The method of claim 8, wherein the offset is represented by an equation:

$$\text{a source cell RSRP} - \text{a target cell RSRP} + X \text{ dBm}.$$

10. The method of claim 8, wherein X is 1, 2, 3, 5, 7, or 9.

11. The method of claim 8, wherein the performing the second handover mobility modification further comprising at least one of:
    initializing an initial second threshold;
    determining a handover success rate of the target cell;
    setting a new second threshold as the initial second threshold responsive to the handover success rate being equal to 99%;

determining whether the initial second threshold combined with a Delta value is greater than a maximum second threshold responsive to the handover success rate being less than 99%;

setting the new second threshold as the initial second threshold responsive to the initial second threshold combined with the Delta value being greater than the maximum second threshold;

setting the new second threshold as the initial second threshold combined with the Delta value responsive to the initial second threshold combined with the Delta value being less than the maximum second threshold;

determining whether the initial second threshold decreased by the Delta value is less than a minimum threshold responsive to the handover success rate being greater than 99%;

setting the new second threshold at the initial second threshold responsive to the initial second threshold decreased by the Delta value being less than a minimum second threshold; and setting the new second threshold as the initial second threshold decreased by the Delta value responsive to the initial second threshold decreased by the Delta value being greater than the minimum second threshold.

12. A system, comprising:
processing circuitry; and
memory connected to the processing circuitry, wherein the memory is configured to store executable instructions that, when executed by the processing circuitry, facilitate performance of operations, comprising:
determining whether user equipment (UE) in a telecommunication network is configured to support evolved universal terrestrial radio access network dual connectivity (ENDC);
responsive to the UE being determined as configured to support the ENDC, determining whether a source cell and a target cell are configured to support the ENDC; and
performing at least one of:
a first handover mobility modification in response to determining the source cell is an ENDC source cell and the target cell is a non-ENDC target cell,
a second handover mobility modification in response to determining the target cell is an ENDC target cell and the source cell is a non-ENDC source cell, wherein the second handover mobility modification is different from the first handover mobility modification, and
a non-modified handover from the source cell to the target cell in response to both the source cell and the target cell being configured for ENDC or both the source cell and the target cell being configured for non-ENDC.

13. The system of claim 12, wherein the performance of operations further comprising:
determining whether the source cell and the target cell are configured to support evolved NodeB (eNB);
determining whether the source cell and the target cell are configured with an upper layer indicator;
determining whether the source cell and the target cell are configured with an absolute radio-frequency channel number (ARFCN); and
determining whether the source cell and the target cell have a secondary gNodeB (SgNB) addition attempt greater than zero or a success rate greater than 90%.

14. The system of claim 12 wherein the performance of operations further comprising:

determining whether the target cell is configured to support ENDC after the source cell is determined to be configured for ENDC.

15. The system of claim 12, wherein the performance of the first handover mobility modification further comprises:
determining whether a source cell ratio of reference signal received power (RSRP)/reference signal received quality (RSRQ) is greater than a first threshold;
determining whether a target cell ratio of RSRP/RSRQ is greater than the source cell ratio of RSRP/RSRQ; and
adding a first offset to the source cell ratio of RSRP/RSRQ to rank the source cell higher than the target cell in a handover process, when the target cell ratio of RSRP/RSRQ is greater than the source cell ratio of RSRP/RSRQ.

16. The system of claim 15, wherein the first offset is represented by an equation:

$$-1(\text{target cell RSRP} - \text{a source cell RSRP} + X \text{ dBm}).$$

17. A method, performed by a central server, comprising:
determining whether user equipment (UE) in a telecommunication network is configured to support evolved universal terrestrial radio access network dual connectivity (ENDC);
responsive to the UE being determined as configured to support the ENDC, determining whether a source cell and a target cell are configured to support the ENDC; and
performing at least one of:
a first handover mobility modification in response to determining the source cell is an ENDC source cell and the target cell is a non-ENDC target cell,
a second handover mobility modification in response to determining the target cell is an ENDC target cell and the source cell is a non-ENDC source cell, wherein the second handover mobility modification is different from the first handover mobility modification, and
a non-modified handover from the source cell to the target cell in response to both the source cell and the target cell being configured for ENDC or both the source cell and the target cell being configured for non-ENDC.

18. The method of claim 17, further comprising:
determining whether the source cell is configured to support evolved NodeB (eNB);
determining whether the source cell is configured with an upper layer indicator;
determining whether the source cell is configured with an absolute radio-frequency channel number (ARFCN); and
determining whether the source cell has a secondary gNodeB (SgNB) addition attempt greater than zero or a success rate greater than 90%.

19. The method of claim 18, further comprising:
determining whether the target cell is configured to support evolved NodeB (eNB);
determining whether the target cell is configured with an upper layer indicator;
determining whether the target cell is configured with an absolute radio-frequency channel number (ARFCN); and
determining whether the target cell has a secondary gNodeB (SgNB) addition attempt greater than zero or a success rate greater than 90%.

20. The method of claim 17, wherein the performing the first handover mobility modification comprises:

determining whether a source cell ratio of a-reference signal received power (RSRP)/reference signal received quality (RSRQ) is greater than a first threshold;

determining whether a target cell ratio of RSRP/RSRQ is greater than the source cell ratio of RSRP/RSRQ; and adding a first offset to the source cell ratio of RSRP/RSRQ to rank the source cell higher than the target cell in a handover process, when the target cell ratio of RSRP/RSRQ is greater than the source cell ratio of RSRP/RSRQ.

* * * * *